(12) United States Patent
Karpik

(10) Patent No.: US 6,691,812 B2
(45) Date of Patent: Feb. 17, 2004

(54) SNOWMOBILE CONSTRUCTION

(75) Inventor: Gerard J. Karpik, Eveleth, MN (US)

(73) Assignee: Formula Fast Racing, Eveleth, MN (US)

( * ) Notice: Subject to any disclaimer, the term of this patent is extended or adjusted under 35 U.S.C. 154(b) by 0 days.

(21) Appl. No.: 10/397,709

(22) Filed: Mar. 26, 2003

(65) Prior Publication Data

US 2003/0183436 A1 Oct. 2, 2003

Related U.S. Application Data

(60) Continuation of application No. 10/202,603, filed on Jul. 24, 2002, now Pat. No. 6,561,302, which is a division of application No. 10/017,214, filed on Dec. 14, 2001, now Pat. No. 6,499,551, which is a division of application No. 09/476,223, filed on Dec. 30, 1999, now Pat. No. 6,357,543.

(60) Provisional application No. 60/114,330, filed on Dec. 31, 1998, and provisional application No. 60/130,000, filed on Apr. 19, 1999.

(51) Int. Cl.$^7$ .............................................. B62M 27/02
(52) U.S. Cl. ....................................... 180/190; 180/296
(58) Field of Search ................................. 180/182, 190, 180/193, 291, 296

(56) References Cited

U.S. PATENT DOCUMENTS

| 3,011,576 A | 12/1961 | Howes |
| 3,089,710 A | 5/1963 | Fiala |

(List continued on next page.)

FOREIGN PATENT DOCUMENTS

| CA | 895747 | 3/1972 |
| CA | 942802 | 2/1974 |
| CA | 944001 | 3/1974 |
| CA | 956674 | 10/1974 |
| CA | 994395 | 8/1976 |
| CA | 1026807 | 2/1978 |
| CA | 1029425 | 4/1978 |
| FI | 850110 | 7/1986 |
| FI | 901451 | 9/1991 |
| FR | 1035475 | 4/1953 |
| JP | 2-293293 | 12/1990 |
| JP | 11-168128 | 6/1999 |
| JP | 11-243638 | 9/1999 |

OTHER PUBLICATIONS

Snowmobile Service Manual, 3$^{rd}$ edition, 1969, Intertec Publishing Corp., Kansas City, Missouri. "Engines: Chrysler", Chrysler Outboard Corporation, Hartford, Wisc. 53027, Condensed Service Data, p. 113.

(List continued on next page.)

Primary Examiner—Kevin Hurley
(74) Attorney, Agent, or Firm—Faegre & Benson LLP

(57) ABSTRACT

A snowmobile assembly including a snowmobile chassis having a motor compartment at a front portion and an endless belt channel at a rear portion. A motor is located substantially in the motor compartment substantially in front of the endless belt channel. The motor includes at least one fuel control mechanism arranged toward a front portion of the snowmobile chassis. By arranging the at least one fuel control mechanism toward the front portion of the snowmobile chassis, the snowmobile assembly provides for greater mass centralization and/or a lower center of gravity than it would otherwise have if the at least one fuel control mechanism arranged toward the rear t portion of the snowmobile chassis. The greater mass centralization and/or a lower center of gravity can also be achieved by arranging the at least one exhaust port toward the rear of the snowmobile chassis. A drive train couples the motor to an endless belt drive shaft located in the endless belt channel. An endless belt is located in the endless belt channel coupled to the endless belt drive shaft.

28 Claims, 17 Drawing Sheets

U.S. PATENT DOCUMENTS

| | | |
|---|---|---|
| 3,115,945 A | 12/1963 | Dry et al. |
| 3,527,505 A | 9/1970 | Hetteen |
| 3,623,563 A | 11/1971 | Gostomski |
| 3,637,265 A | 1/1972 | Valentine et al. |
| 3,658,392 A | 4/1972 | Perreault et al. |
| 3,711,164 A | 1/1973 | Chaumont |
| 3,721,308 A | 3/1973 | Brandli et al. |
| 3,727,709 A | 4/1973 | Newman |
| 3,744,583 A | 7/1973 | Bedard |
| 3,776,354 A | 12/1973 | Duclo et al. |
| 3,788,412 A | 1/1974 | Vincent |
| 3,879,092 A | 4/1975 | Rose |
| 3,913,693 A | 10/1975 | Hale et al. |
| 3,913,694 A | 10/1975 | Forsgren |
| 3,933,213 A | 1/1976 | Trowbridge |
| 3,944,005 A | 3/1976 | Tomita |
| 3,945,663 A | 3/1976 | Duckett |
| 3,966,151 A | 6/1976 | Hawkins, III |
| 3,966,181 A | 6/1976 | Lessard |
| 4,010,544 A | 3/1977 | Siman |
| 4,057,916 A | 11/1977 | Roemer |
| 4,131,266 A | 12/1978 | Carter |
| 4,222,453 A | 9/1980 | Fixsen et al. |
| 4,226,408 A | 10/1980 | Tomita et al. |
| 4,311,302 A | 1/1982 | Heyer et al. |
| 4,337,958 A | 7/1982 | Witt et al. |
| 4,407,386 A | 10/1983 | Yasui et al. |
| 4,411,342 A | 10/1983 | Katsumori et al. |
| 4,442,926 A | 4/1984 | Muto |
| 4,489,954 A | 12/1984 | Yasui et al. |
| 4,518,056 A | 5/1985 | Kobayashi |
| 4,671,521 A | 6/1987 | Talbot et al. |
| 4,690,234 A | 9/1987 | Takada |
| 4,690,235 A | 9/1987 | Miyakoshi |
| 4,700,815 A | 10/1987 | Persicke et al. |
| 4,710,599 A | 12/1987 | Motodate et al. |
| 4,756,517 A | 7/1988 | Kakimoto |
| 4,804,198 A | 2/1989 | Imai et al. |
| 4,843,293 A | 6/1989 | Futami |
| 4,895,383 A | 1/1990 | Abe et al. |
| 4,911,466 A | 3/1990 | Blair |
| 4,919,441 A | 4/1990 | Marier et al. |
| 4,987,965 A | 1/1991 | Bourret |
| 5,014,805 A | 5/1991 | Uchida |
| 5,029,664 A | 7/1991 | Zulawski |
| 5,060,745 A | 10/1991 | Yasui et al. |
| 5,086,861 A | 2/1992 | Peterson |
| 5,094,472 A | 3/1992 | Oyama et al. |
| 5,172,786 A | 12/1992 | Ishibashi et al. |
| D333,110 S | 2/1993 | Mogi et al. |
| 5,199,401 A | 4/1993 | O'Neil et al. |
| 5,203,424 A | 4/1993 | Gogo et al. |
| 5,265,692 A | 11/1993 | Mallette |
| 5,270,625 A | 12/1993 | Neff |
| 5,279,381 A | 1/1994 | Fukuda |
| 5,324,056 A | 6/1994 | Orton |
| 5,333,989 A | 8/1994 | Missana et al. |
| 5,353,902 A | 10/1994 | Flowtow et al. |
| 5,370,198 A | 12/1994 | Karpik |
| 5,450,202 A | 9/1995 | Tisue |
| 5,533,585 A | 7/1996 | Kawano et al. |
| 5,568,840 A | 10/1996 | Nagata et al. |
| 5,667,031 A | 9/1997 | Karpik |
| D389,780 S | 1/1998 | Komatsu et al. |
| 5,727,643 A | 3/1998 | Kawano et al. |
| 5,829,545 A | 11/1998 | Yamamoto et al. |
| 5,853,061 A | 12/1998 | Yamamoto et al. |
| 5,881,834 A | 3/1999 | Karpik |
| 5,904,217 A | 5/1999 | Yamamoto et al. |
| 5,947,220 A | 9/1999 | Oka et al. |
| 5,957,230 A | 9/1999 | Harano et al. |
| 5,964,311 A | 10/1999 | Yamamoto et al. |
| 5,992,552 A | 11/1999 | Eto |
| 5,996,717 A | 12/1999 | Hisadomi |
| 6,006,715 A | 12/1999 | Izumi et al. |
| 6,032,752 A | 3/2000 | Karpik et al. |
| 6,032,754 A | 3/2000 | Izumi et al. |
| 6,067,872 A | 5/2000 | Miyahara et al. |
| 6,070,683 A | 6/2000 | Izumi et al. |
| 6,134,984 A | 10/2000 | Hisadomi |
| 6,142,494 A | 11/2000 | Higuchi |
| 6,170,589 B1 | 1/2001 | Kawano et al. |
| 6,170,590 B1 | 1/2001 | Hisadomi |
| 2001/0001995 A1 | 5/2001 | Izumi et al. |
| 2001/0040064 A1 | 11/2001 | Girouard et al. |
| 2001/0047900 A1 | 12/2001 | Fecteau et al. |
| 2002/0027029 A1 | 3/2002 | Yatagai et al. |
| 2003/0029658 A1 * | 2/2003 | Etou .................... 180/190 |
| 2003/0146032 A1 * | 8/2003 | Yatagai et al. ........... 180/186 |

OTHER PUBLICATIONS

Snowmobile Service Manual, $3^{rd}$ edition, 1969, Intertec Publishing Corp., Kansas City, Missouri. "Engines: Wankel (Rotating Combustion) Engine", Curtiss–Wright Corporation, 35 Market Street, East Paterson, N.J. 47407, p. 167.

Snowmobile Service Manual, $3^{rd}$ edition, 1969, Intertec Publishing Corp., Kansas City, Missouri. "Vehicles: Ski Whiz", Massey Ferguson, Inc., 1901 Bell Avenue, Des Moines, Iowa 50312, Condensed Service Data, pp. 64–65.

* cited by examiner

SNOWMOBILE CONSTRUCTION

CROSS-REFERENCE TO RELATED APPLICATIONS

The present invention is a Continuation of patent application Ser. No. 10/202,603, filed Jul. 24, 2002, now U.S. Pat. No. 6,561,302 entitled "Snowmobile Construction", which is a divisional of U.S. patent application Ser. No. 10/017,214, entitled "Snowmobile Construction", filed Dec. 14, 2001, now U.S. Pat. No. 6,499,551; which is a divisional of U.S. patent application Ser. No. 09/476,223, entitled "Snowmobile Construction", filed Dec. 30, 1999, now U.S. Pat. No. 6,357,543; which claims the benefit of U.S. Provisional Application No. 60/114,330 entitled Modular Front Suspension System and Stabilizer Assembly for a Snowmobile, filed Dec. 31, 1998, now abandoned; and U.S. Provisional Application No. 60/130,000 entitled Snowmobile Construction, filed Apr. 19, 1999.

FIELD OF THE INVENTION

This invention is directed to various innovations in snowmobile design, including a drive train that reduces the center of gravity and/or increases mass centralization of the snowmobile.

BACKGROUND OF THE INVENTION

Snowmobile design has incrementally moved towards more powerful motors, with a resulting increase in the weight of the machines due to the larger motor and corresponding support structure. Frequently, increased weight results in a higher center of gravity of the snowmobile. Increased weight and increased center of gravity can have a detrimental affect on the ride quality and handling characteristics of the snowmobile.

Handling, cornering and ride quality are largely dependent upon the front suspension system of the snowmobile. It is common practice to suspend the skis of a snowmobile independently by means of respective strut type suspensions. It is desirable to provide some form of stabilizer or sway bar arrangement interconnecting the front skis to reduce the amount of leaning that occurs during cornering of the snowmobile. Due to the rough and sometimes uncertain terrain over which snowmobiles are ridden, it is desirable that the stabilizer arrangement be positioned so that it will be protected if unexpected objects are encountered, such as disclosed in U.S. Pat. No. 4,690,234 (Takada).

U.S. Pat. No. 4,489,954 discloses an anti-roll mechanism that includes a torsion bar supported by the body that is connected to the skis for torsion loading upon independent movement of the skis relative to the body. The connection between each of the skis and the torsion bar is such that the torsion bar is loaded by the pivotal movement of the skis about their steering axes for providing a self-centering force on the skis.

U.S. Pat. No. 4,671,521 (Talbot, et al) discloses a snowmobile ski suspension including upper and lower transverse suspension arms vertically spaced and each having an outboard end articulated to a ski spindle and an inboard end articulated to a fixed mounting on the frame of the snowmobile. The upper and lower transverse suspension arms define a parallelogram linkage for guiding the spindle to move generally vertically with respect to the snowmobile.

U.S. Pat. No. 5,029,664 (Zuwalski) discloses a suspension system with a geometry that includes upper and lower suspension linkages of predetermined lengths in cooperation with a spindle of a predetermined length for eliminating lateral movement of the skis during suspension travel. The respective linkages and spindles are interconnected by ball joints at predetermined locations in such a manner that during deflection of the suspension system, a ski attached to the lower end of the spindle moves substantially in a line parallel to a vertical plane which contains the longitudinal axis of the snowmobile.

What is needed is a snowmobile design that provides a high power-to-weigh ratio while maintaining optimum handling characteristics and ride quality.

BRIEF SUMMARY OF THE INVENTION

The present invention is directed to various innovations in snowmobile design. In one embodiment, the snowmobile includes a modular front suspension system and a stabilizer assembly. In another embodiment, the frame structure includes a lightweight frame structure. In yet another embodiment, the snowmobile includes a drive train that reduces the center of gravity. Finally, all of these features are combined on a single snowmobile.

The present snowmobile assembly includes a snowmobile chassis having a motor compartment at a front portion and an endless belt channel at a rear portion. A motor is located substantially in the motor compartment substantially in front of the endless belt channel. The motor includes at least one exhaust port arranged toward a rear portion of the snowmobile chassis and/or at least one fuel control mechanism arranged toward a front portion of the snowmobile chassis. By arranging the at least one exhaust port toward the rear portion of the snowmobile chassis, the snowmobile assembly has greater mass centralization and/or a lower center of gravity than it would otherwise have if the exhaust port was arranged toward the front portion of the snowmobile chassis. Similarly, by arranging the at least one fuel control mechanism toward the front portion of the snowmobile chassis, the snowmobile assembly has greater mass centralization and/or a lower center of gravity than it would otherwise have if the exhaust port was arranged toward the front portion of the snowmobile chassis. A drive train couples the motor to an endless belt drive shaft located in the endless belt channel. An endless belt is located in the endless belt channel coupled to the endless belt drive shaft.

The present invention is also directed to a chassis for a snowmobile having an endless belt drive system. The chassis includes a plurality of front structural members defining a motor compartment. Front suspension system mounting locations are positioned on distal ends of two or more of the front structural members. A pair of independent, rear structural members are rigidly connected to the front structural members and extend rearwardly from the motor compartment on opposite sides of an endless belt channel. A protective shell extends between the pair of rear structural members and over the endless belt channel. In one embodiment, the protective shell comprises a lightweight, resin based material that transfers substantially no loads between the pair of rear structural members. The snowmobile chassis further includes a rear suspension system extending between the pair of rear structural members. The rear suspension system transfers substantially all loads between the pair of rear structural members.

In one embodiment, the snowmobile chassis includes a motor located in the motor compartment. The motor has at least one carburetor positioned on a first side of the motor adjacent to the front suspension system mounting locations and an exhaust port positioned on a second side of the motor.

The present invention is also directed to a snowmobile chassis having a motor compartment and an endless belt channel. A motor is located in the motor compartment. The motor has at least one carburetor positioned on a first side of the motor adjacent to a front suspension system and an exhaust port positioned on a second side of the motor. The motor has a drive clutch. A driven pulley is located on a gearbox that is located adjacent to the endless belt channel. An endless belt drive shaft is located in the endless belt channel and mechanically coupled directly to the gearbox. A drive belt mechanically couples the drive clutch to the driven pulley. A torque arm connects the driven pulley to the snowmobile chassis.

DETAILED DESCRIPTION OF THE INVENTION

Figure 1:
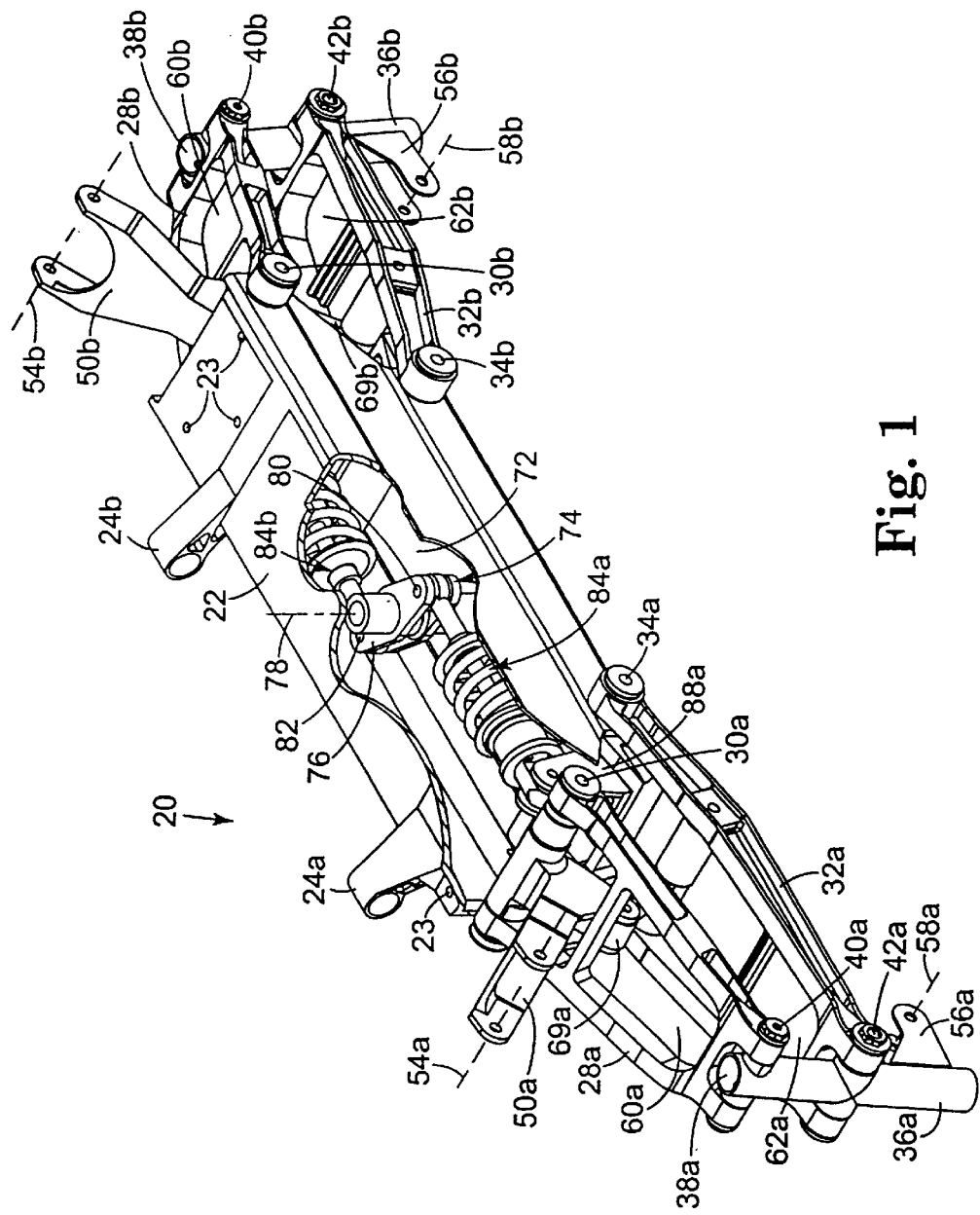
FIG. 1 is a perspective view of a modular suspension system in accordance with the present invention.
Figure 2:
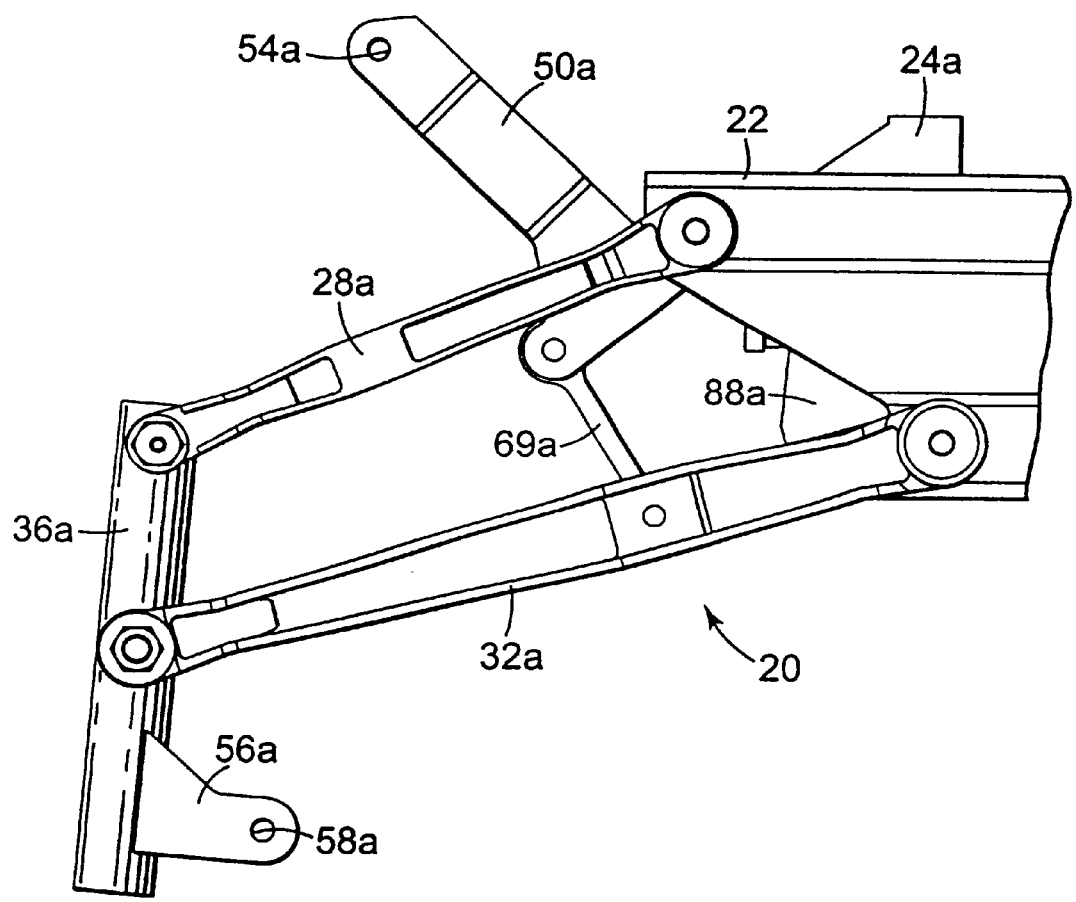
FIG. 2 is a front view of a portion of the suspension system of FIG. 1.

FIGS. 1–2 illustrate various aspects of a modular front suspension system 20 in accordance with the present invention. The various components of the modular front suspension system 20 are built around and attached to a primary support structure 22. In the illustrated embodiments, the primary support structure 22 comprises a hollow metal extrusion, preferably constructed from an aluminum alloy. In an alternate embodiment, the primary support structure 22 may be an I-beam, a solid member, a welded member, a cast member, a hollow member containing reinforcing webs, or a variety of other structures. Steering brackets 24a, 24b are attached to the primary support structure 22 for receiving a steering linkage mechanism (not shown).

Figure 8:
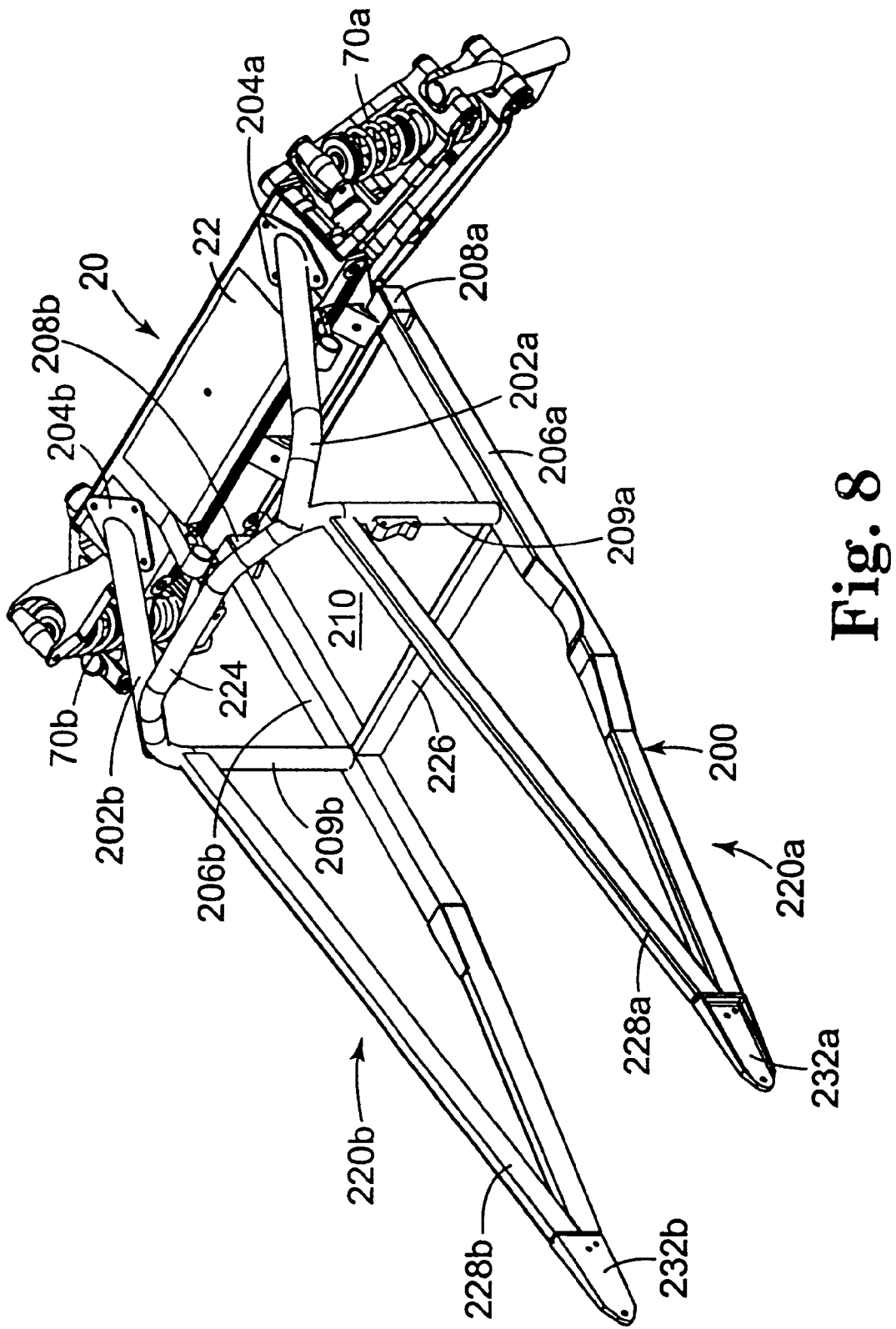
FIG. 8 is a perspective view of the present front suspension assembly mounted to a snowmobile frame.
Figure 9:
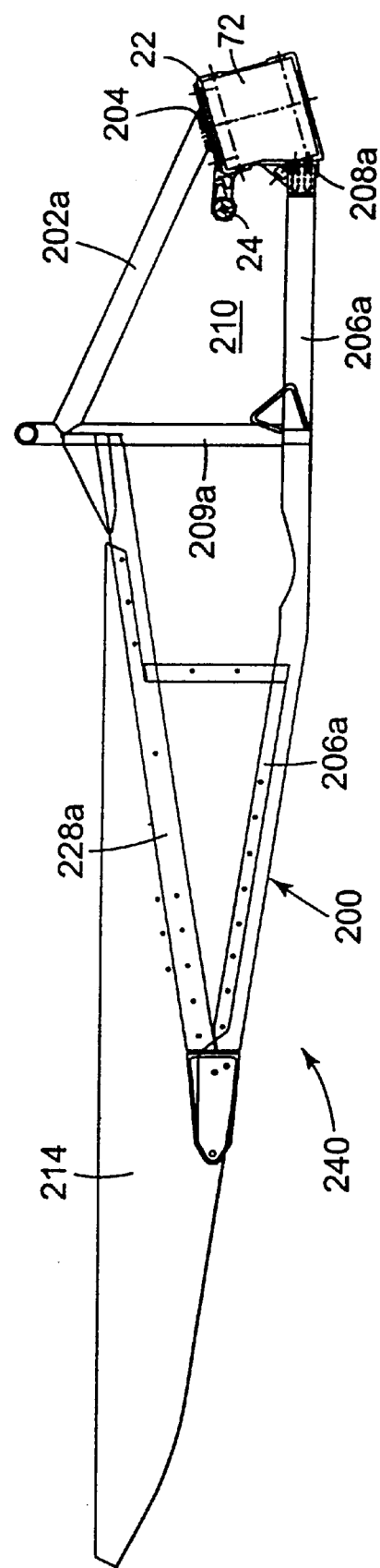
FIG. 9 is a side view of a primary support structure in accordance with the present invention mounted to a snowmobile chassis.

Various mounting holes 23 are located on the primary support structure 22 for attachment to the snowmobile frame 200 (see FIGS. 8 and 9). The primary support structure 22 defines a center opening 72. Stabilizer assembly 74 is located in the center opening 72 (see also FIG. 9). Since the modular front suspension assembly is generally symmetrical, corresponding components are generally referred to herein with the suffix "a" or "b", while these components may also be referred to generically without the suffix.

The modular front suspension system 20 includes upper control arms 28a, 28b pivotally mounted to the primary support structure 22 at upper control arm axes 30a, 30b. Lower control arms 32a, 32b are pivotally mounted to the primary support structure 22 at lower control arm axes 34a, 34b. In the illustrated embodiment, the upper control arm axes 30a, 30b are located above the lower control arm axes 34a, 34b, with respect to the front suspension system 20 being mounted to a snowmobile frame (see FIG. 8). Distal ends of the upper and lower control arms 28a, 32a, 28b, 32b are pivotally attached to spindle housings 36a, 36b at axes 40a, 42a, 40b, 42b, respectively. The spindle housings 36a, 36b includes openings 38a, 38b for receiving a ski spindle and ski (not shown).

Shock mounts 50a, 50b are pivotally attached to either the primary support structure 22 or the upper control arms axes 30a, 30b. In the illustrated embodiment, the shock mounts 50a, 50b are mounted to the primary support structure 22 along the upper control arm axes 30a, 30b. The shock mounts 50a, 50b includes a pair of holes defining axes 54a, 54b for receiving a shock absorber assembly 70 (see also FIG. 8).

Lower shock mounts 56a, 56b are rigidly attached to the respective spindle housings 36a, 36b. In an alternate embodiment, the lower shock mounts 56a, 56b can be attached to the lower control arms 32a, 32b, respectively. The upper control arms 28a, 28b include shock absorber openings 60a, 60b. The lower control arms 32a, 32b include shock absorber openings 62a, 62b. The shock absorber openings 60, 62 permit a shock absorbers 70a, 70b (see FIGS. 3 and 8) to be pivotally mounted to the axes 54a, 54b of the shock mounts 50a, 50b and axes 58a, 58b of the lower shock mounts 56a, 56b. As best seen in FIG. 2, lower portion of the shock mounts 50a, 50b are pivotally connected to the lower control arms 32a, 32b by links 69a, 69b. In another embodiment, the shock mounts 50a, 50b may be attached directly to the primary support structure 22 or the vehicle chassis 240.

The stabilizer assembly 74 includes a rocker arm 76 pivotally mounted within the primary support structure 22 to rotate around an axis 78. First and second ends 80, 82 of the rocker arm 76 are pivotally attached to respective stabilizer member assemblies 84a, 84b. The stabilizer member assemblies 84a, 84b are pivotally attached to the lower control arms 32a, 32b by a pair of stabilizer brackets 88a, 88b (see FIG. 5). In an alternate embodiment, the stabilizer brackets 88a, 88b are pivotally attached to the upper control arms 28a, 28b or the shock mounts 50a, 50b.

Figure 3:
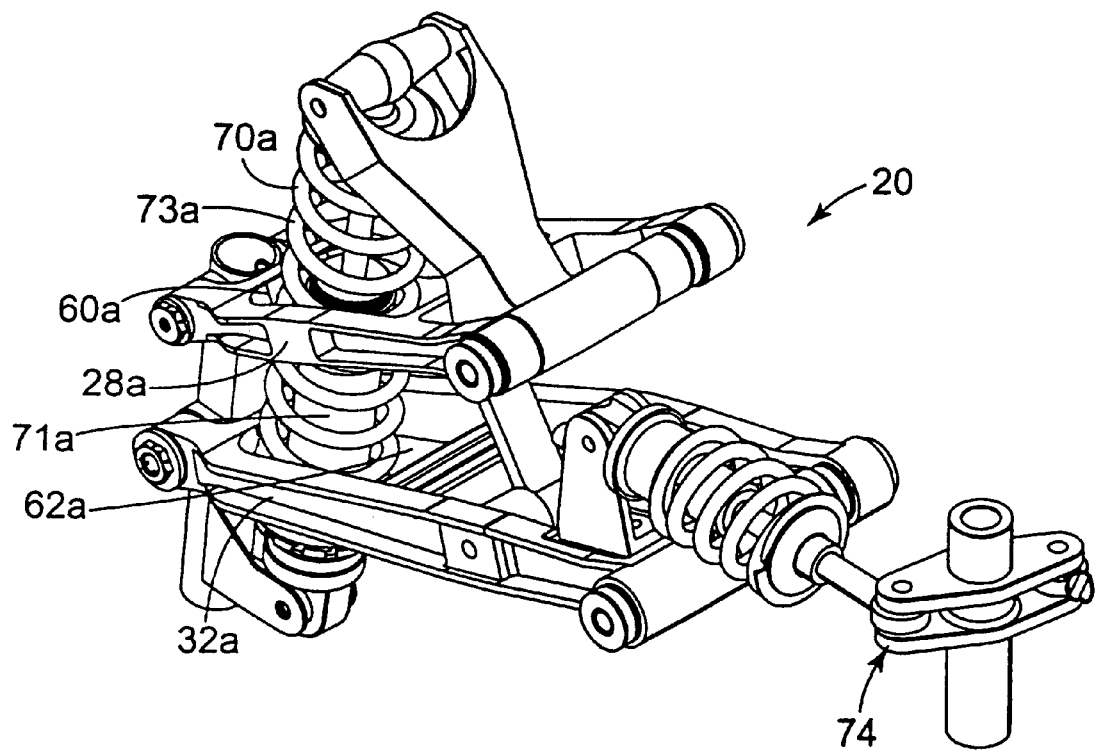
FIG. 3 is a perspective view of a portion of a front suspension system in accordance with the present invention with the support structure removed.

FIG. 3 is a perspective view of one side of the present modular front suspension system 20 and a portion of the stabilizer assembly 74 with the primary support structure 22 removed. Shock absorber 70a extends through the opening 60a, 62a in the upper and lower control arms 28a, 32a. In the illustrated embodiment, the shock absorber assembly 70a includes a shock absorber 71a surrounded by a spring 73a, although other shock absorber or spring assemblies are possible.

Figure 4:
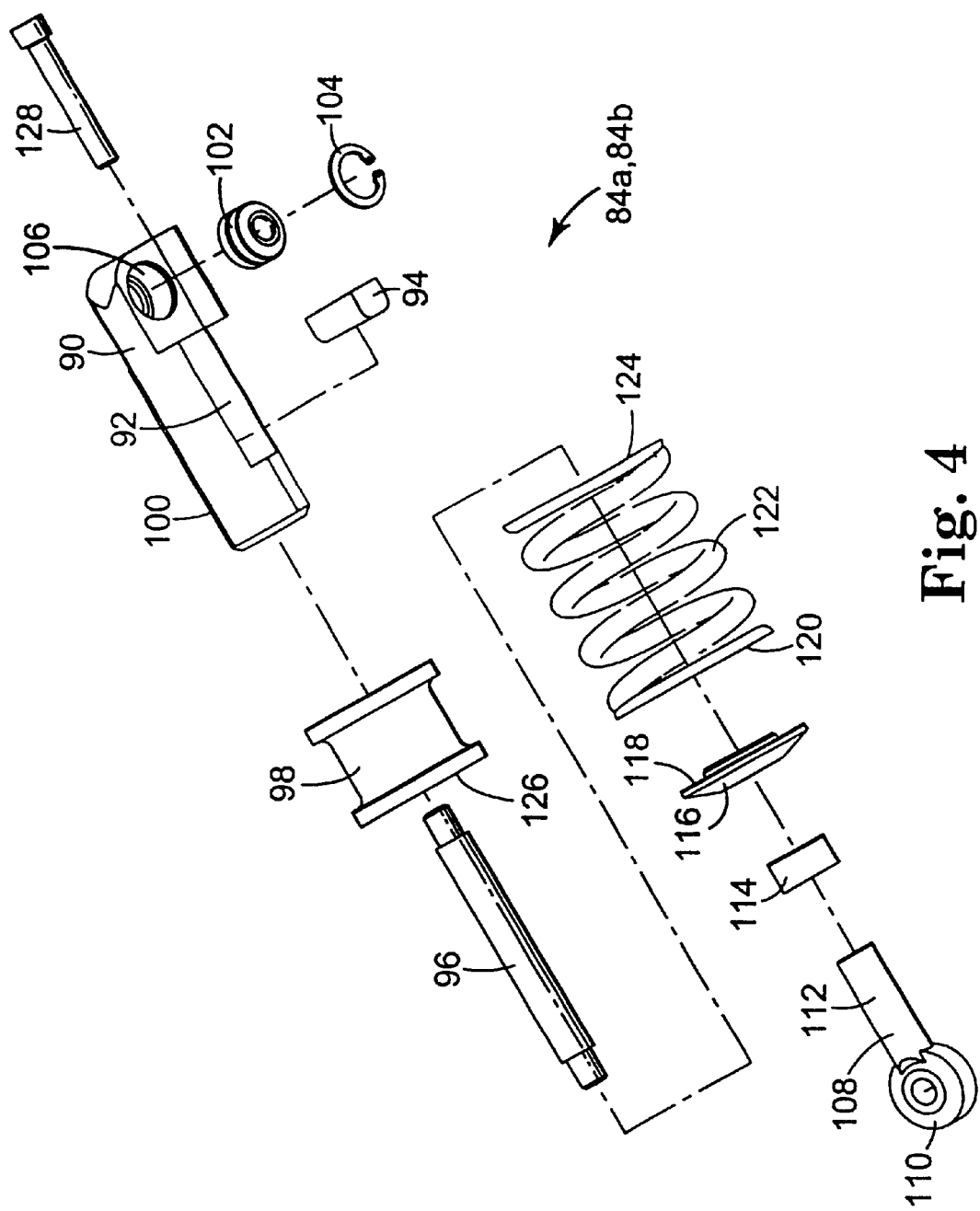
FIG. 4 is an exploded view of a stabilizer member assembly in accordance with the present invention.

FIG. 4 is an exploded view of the stabilizer member assemblies 84a, 84b in accordance with the present invention. Control arm mounting portion 90 includes a slot 92 for receiving a sliding nut 94. Rod 96 engages with the sliding nut 94. The sliding nut 94 permits the rod 96 to telescope or extend relative to the control arm-mounting portion 90 along the full length of the slot 92. The stabilizer member assemblies 84a, 84b top-out or bottom-out when the sliding nut 94 is at one end of the slot 92 or the other. Sleeve 98 slidably engages with outer surface 100 of the control arm-mounting portion 90. A bearing 102 is provided to facilitate pivotal engagement with the stabilizer brackets 88a, 88b (see FIG. 5). Retaining ring 104 holds the bearing 102 in opening 106 on the control arm-mounting portion 90.

Rocker arm mounting portion 108 also includes a bearing 110 to facilitate pivotal engagement with the rocker arm 76. Distal end of the shaft 112 includes a sleeve 114 and a spring cap 116 rigidly mounted thereto. Surface 118 of the spring cap 116 engages with surface 120 of spring 122. The opposite surface 124 of the spring 122 engages with surface 126 of the sleeve 98.

Stabilizer preload adjustment screw 128 is provided in the control arm-mounting portion 90 for sliding the sleeve 98 towards the spring 122. As will be discussed in detail below, the preload adjustment screw 128 permits the spring 122 to be preloaded to a desired level within the stabilizer member assemblies 84a, 84b.

Figure 4A:
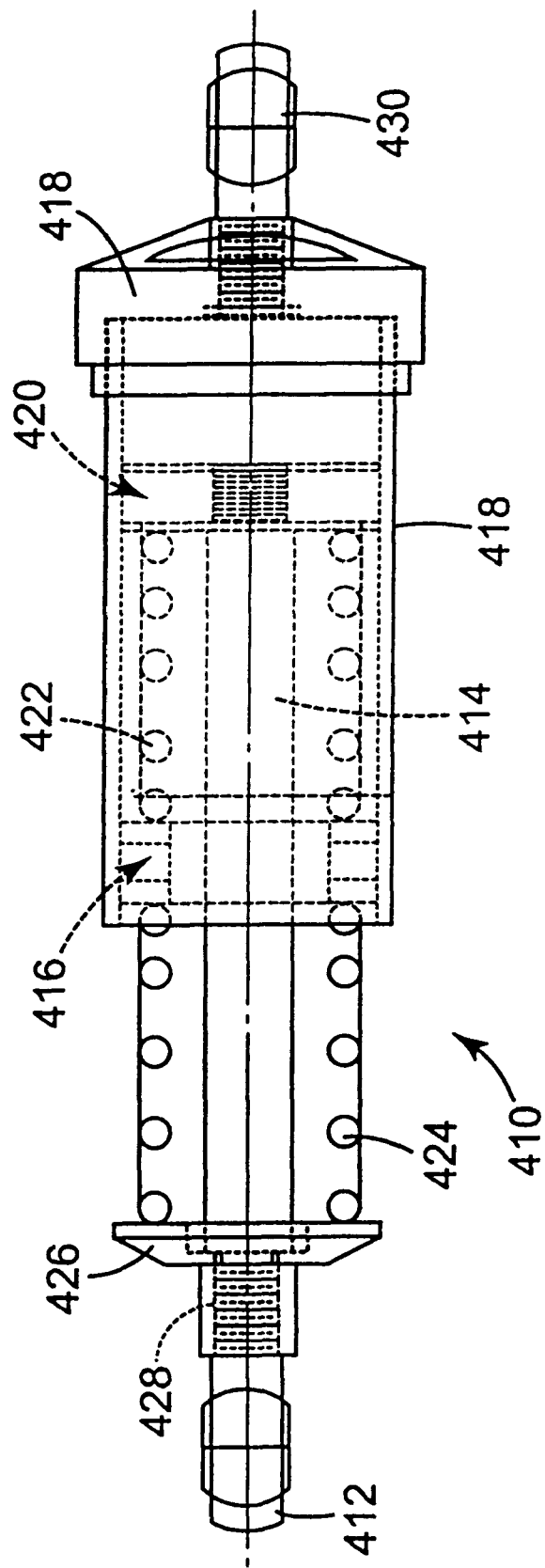
FIG. 4A illustrates an alternate stabilizer member assembly in accordance with the present invention.

FIG. 4A illustrates a double-acting spring assembly suitable for use as an alternate stabilizer member assembly 410 in accordance with the present invention. Control arm mounting portion 412 is attached to a sliding rod 414 that extends through a fixed divider 416 that is attached to a housing 418. A sliding retainer 420 that slides within the housing 418 is attached to the other end of the rod 414. A first spring 422 wraps around the rod 414 and is interposed between the sliding retainer 420 and the fixed divider 416. A second spring 424 wrap around the rod 414 and is interposed between the fixed divider 416 and an adjustable spring cap 426. The rod 414 has a threaded portion 428 that permits the location of the spring cap 426 to be adjusted so that a preload can be applied to the springs 424, 426. The housing 418 includes a rocker arm mounting portion 430. The stabilizer member assembly 410 tops-out or bottoms-out when either of the springs 422, 424 are fully compressed. In one embodiment, the alternate stabilizer member assembly 410 is substituted for one of the stabilizer member assemblies 84a, 84b, and a rigid rod is substituted for the other stabilizer members assembly.

Figure 5:
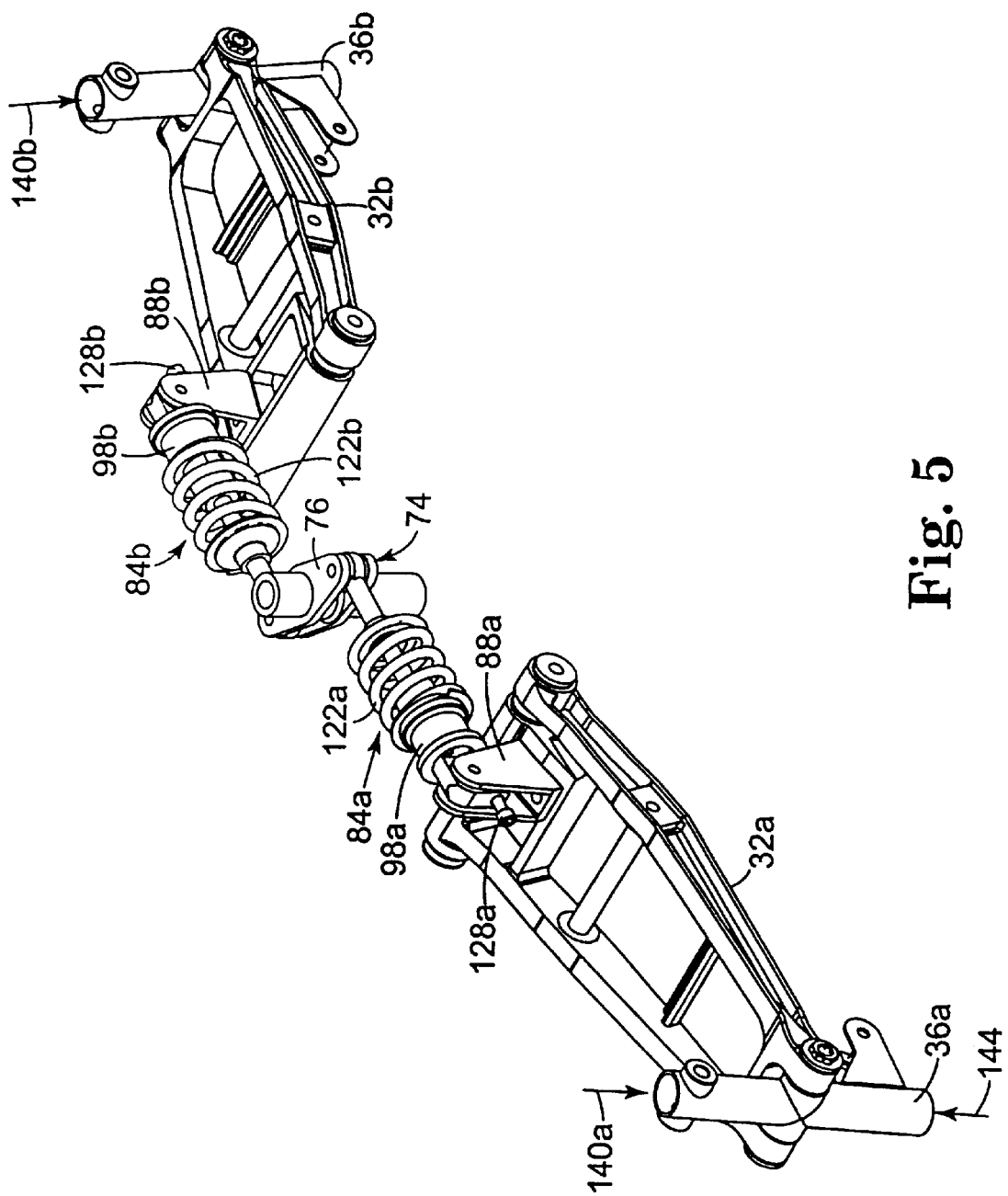
FIG. 5 is a perspective view of a stabilizer system in accordance with the present invention.
Figure 6:
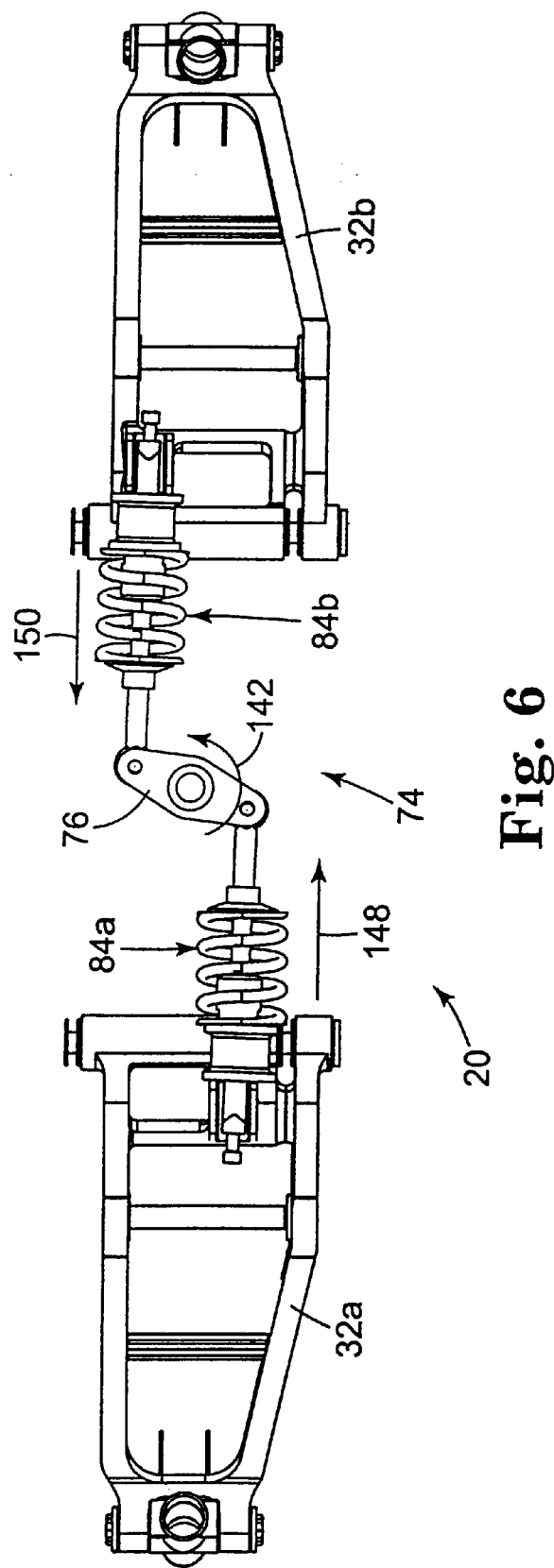
FIG. 6 is a top view of the stabilizer system of FIG. 5.
Figure 7:
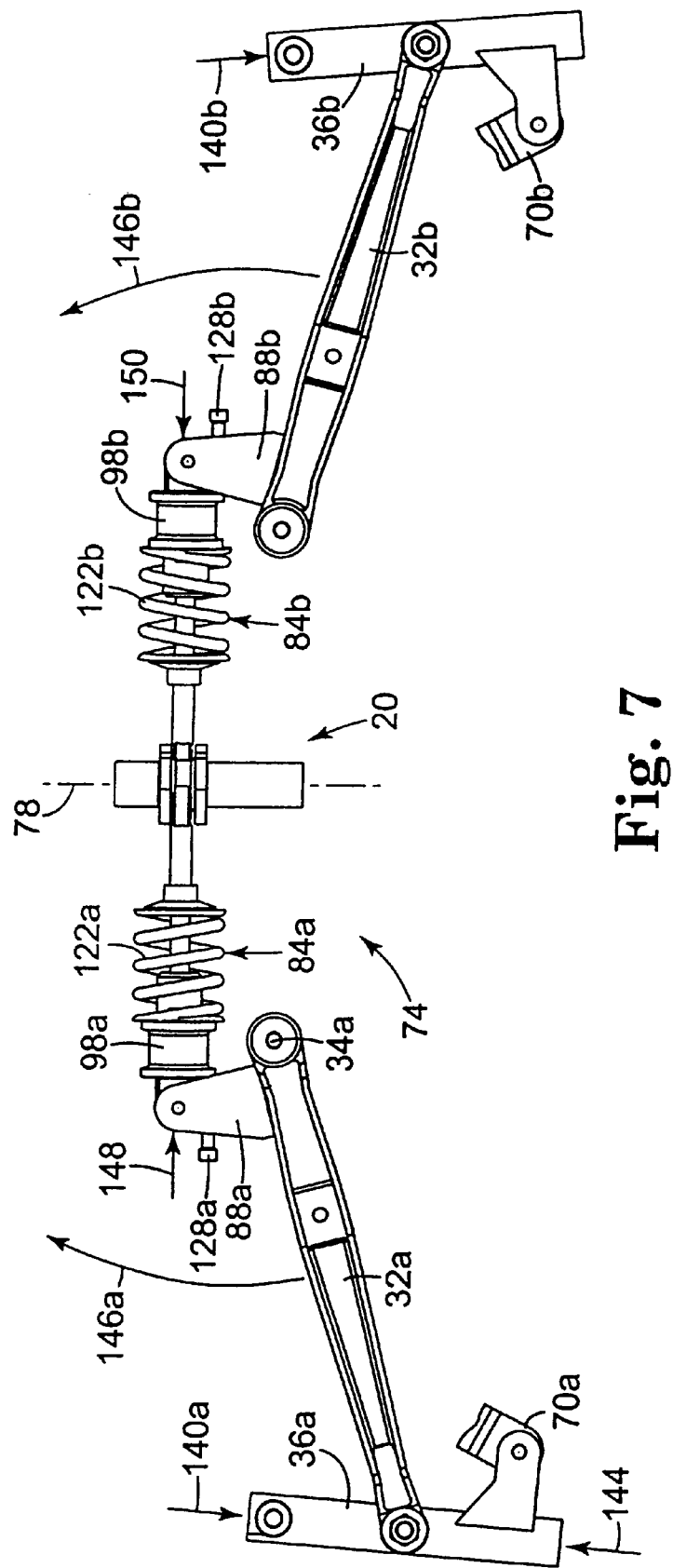
FIG. 7 is a rear view of the stabilizer system of FIG. 5.

FIGS. 5–7 illustrate various views of the stabilizer assembly 74 with the primary support structure 22 removed. In a horizontal resting state, the shock absorbers/spring assemblies 70a, 70b (see FIG. 8) provide a downwardly biasing force 140a, 140b on the spindle housings 36a, 36b. The horizontal resting state refers to the snowmobile being stationary on a substantially horizontal surface. When an upward bump force 144 greater than the force 140a is imposed on the spindle housing 36a, the lower control arm 32a will rotate in a direction 146a around the lower control arm axis 34a. Rotation of the lower control arm 32a displaces the stabilizer bracket 88a in a direction 148. Assuming that the stabilizer member assembly 84b is at its fully elongated or topped-out position, displacement of the stabilizer bracket 88a in the direction 148 will have the effect of rotating the rocker arm 76 in the direction 142, which in turn will move the stabilizer member assembly 84b in a direction 150.

Once the stabilizer member assembly 84b is in the fully elongated position, movement of the stabilizer bracket 88b in the direction 150 will have the effect of raising the lower control arm 32b in opposition to the force 140b provided by the shock absorber 70b. Consequently, spring force from the shock absorber 70b will be transferred to the lower control arm 32a on the other side of the modular front suspension system 20.

In another embodiment, preload adjustment screws 128a, 128b are advanced so that the sleeves 98a, 98b partially compress the springs 122a, 122b. When in the horizontal resting state, any load on the springs 122a, 122b will cause the stabilizer member assemblies 84a, 84b to elongate to their maximum length and rotate the rocker arm 76 in a direction 142. Ultimately, the stabilizer member assemblies 84a, 84b are in their fully extended state and do not rotate the rocker arm 76 any further. At this point, further advancing the sleeves 98a, 98b using the preload adjustment screws 128a, 128b will develop a preload in the springs 122a, 122b.

When the bump force 144 increases to a level that is greater than the shock absorber/spring assembly force 140a, the lower control arm 32a rotates in a direction 146a. Rotation in the direction 146a is initially resisted by a combination of the downward force 140b on the spindle housing 36b, as discuss above, and the spring force from spring 122a. As the spring 122a is compressed, the spring force of spring 122a rises until it overcomes the downward force 140b from the shock absorber/spring assembly 70b, forcing the lower control arm 32b to rotate in the direction 146b. As the lower control arm 32b rotates in the direction 146b, the shock absorber/spring assembly 70b is compressed and the force 140b increases. A component of the increased force 140b is transmitted through the stabilizer assembly 74 to the spindle housing 36a.

The configuration discussed above allows for a non-linear relationship between the stabilizer mechanism 74 and the shock absorber/spring assemblies 70a, 70b. For example, it is possible to have a firm initial roll stiffness of the snowmobile for smooth corners and soft roll stiffness for bumpy corners by increasing the preload on the springs 122a, 122b. Alternatively, for a more linear relationship between the stabilizer mechanism 74 and the shock absorber/spring assemblies 70a, 70b, less preload on the springs 122a, 122b is used.

One practical application of the present stabilizer assembly 74 is that is provides initially very stiff displacement of the lower control arms 32a, 32b for smooth cornering on relatively smooth surfaces. When rough terrain is encountered, further displacement of the lower control arms 32a, 32b will require less additional force than the original displacement. In one embodiment, the force-displacement curve for the present stabilizer assembly 74 is essentially a step function in which the force per unit displacement is reduced after an initial amount of displacement is achieved.

FIGS. 8 and 9 illustrate a modular front suspension system 20 in accordance with the present invention mounted to a snowmobile frame 200. The primary support structure 22 is attached to upper frame members 202b, 202b at upper frame mounting locations 204a, 204b. Lower frame members 206a, 206b are attached to the primary support structure 22 at lower frame mounting locations 208a, 208b. Removable fasteners, such as bolt, are preferred for attaching the primary support structure 22 to the snowmobile frame 200. The primary support structure 22 permits easy assembly and removal of the modular front suspension system 20 from the snowmobile frame 200. Additionally, the primary support structure 22 provides a substantial barrier that protects motor compartment 210.

The snowmobile frame 200 includes a left frame portion 220a and a right frame portion 220b. The left and right frame portions 220a, 220b are join together by an upper cross piece 224 and a lower cross piece 226 immediately behind the engine compartment 210. Vertical supports 209a, 209b extends between frame members 202b, 206a and 202b, 206b, respectively. The lower frame members 206a, 206b extend rearward of the engine compartment 210. Upper rear frame member 228a extends from the upper portion of the vertical support 209a to the distal rearward end of the lower frame member 206a. The frame members 228a and 206a are joined at a mounting plate 232a. Upper rear frame member 228b extends from about the upper portion of the vertical support 209b to the distal rearward end of the lower frame member 206b. The frame members 228b and 206b are joined at a mounting plate 232b. The rearward frame members 228a, 206a are not connected to the rearward frame members 228b, 206b at any location behind the vertical supports 209a, 209b and the cross pieces 224, 226, thereby reducing the weight of the frame 200. The independent, free-floating nature of the rearward frame members 228a, 206a and 228b, 206b is believed to improve the handling properties of the snowmobile.

FIG. 9 is a side view of the snowmobile chassis 240 including a protective shell 214 attached to, and extends between, the rearward frame members 228a, 206a and 228b, 206b. The protective shell 214 prevents snow and debris from reaching seat region 402. In the illustrated embodiment, the protective shell 214 is constructed from a resin-based material, such as fiberglass or fiberglass reinforced with Kevlar® fibers or other lightweight reinforcing materials. Kevlar is an aromatic polyamid fiber of extremely high tensile strength and greater resistance to elongation than steel. It has high-energy absorption properties that make it particularly suitable for use as a reinforcing material for plastic composites.

The protective shell 214 is typically not a structural member for transferring loads between the rearward frame members 228a, 206a and 228b, 206b. Loads are transferred between these rearward frame members by the rear suspensions system for the endless track, such as the suspension systems disclosed in U.S. Pat. Nos. 5,370,198, 5,667,031, and 6,032,752.

The primary support structure 22 with the front suspension components removed is shown mounted to the snowmobile chassis 240. Center opening 72 is typically perpendicular to the longitudinal axis of the snowmobile frame 200. Steering brackets 24 are located behind the primary support structure 22 in the motor compartment 210 to protect them from damage during impacts with obstacles. Additionally, heat generated within the motor compartment 210 may reduce the accumulation of ice and snow on the steering linkage mechanism (not shown).

Figure 10:
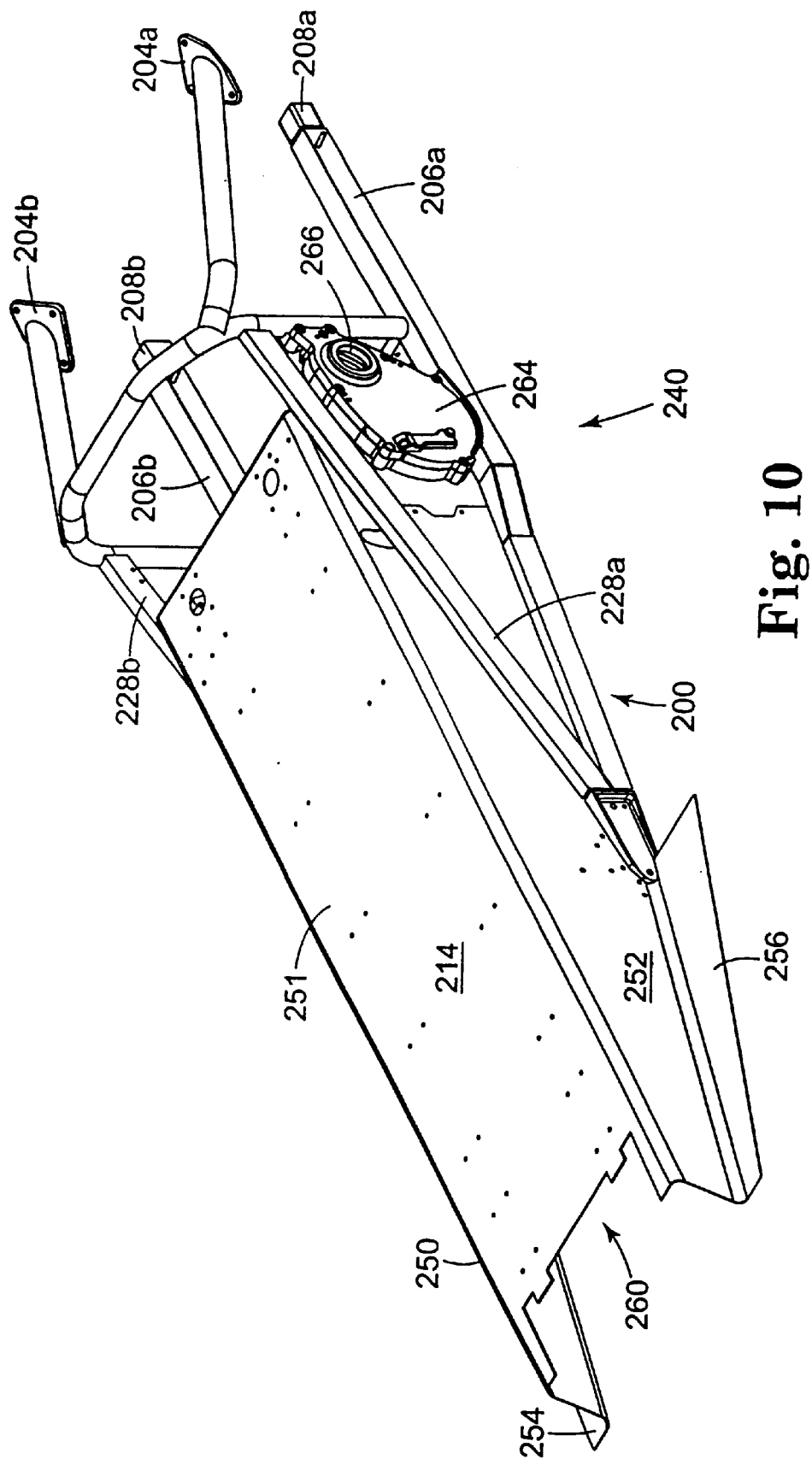
FIG. 10 is a side perspective view of a snowmobile chassis in accordance with the present invention.
Figure 11:
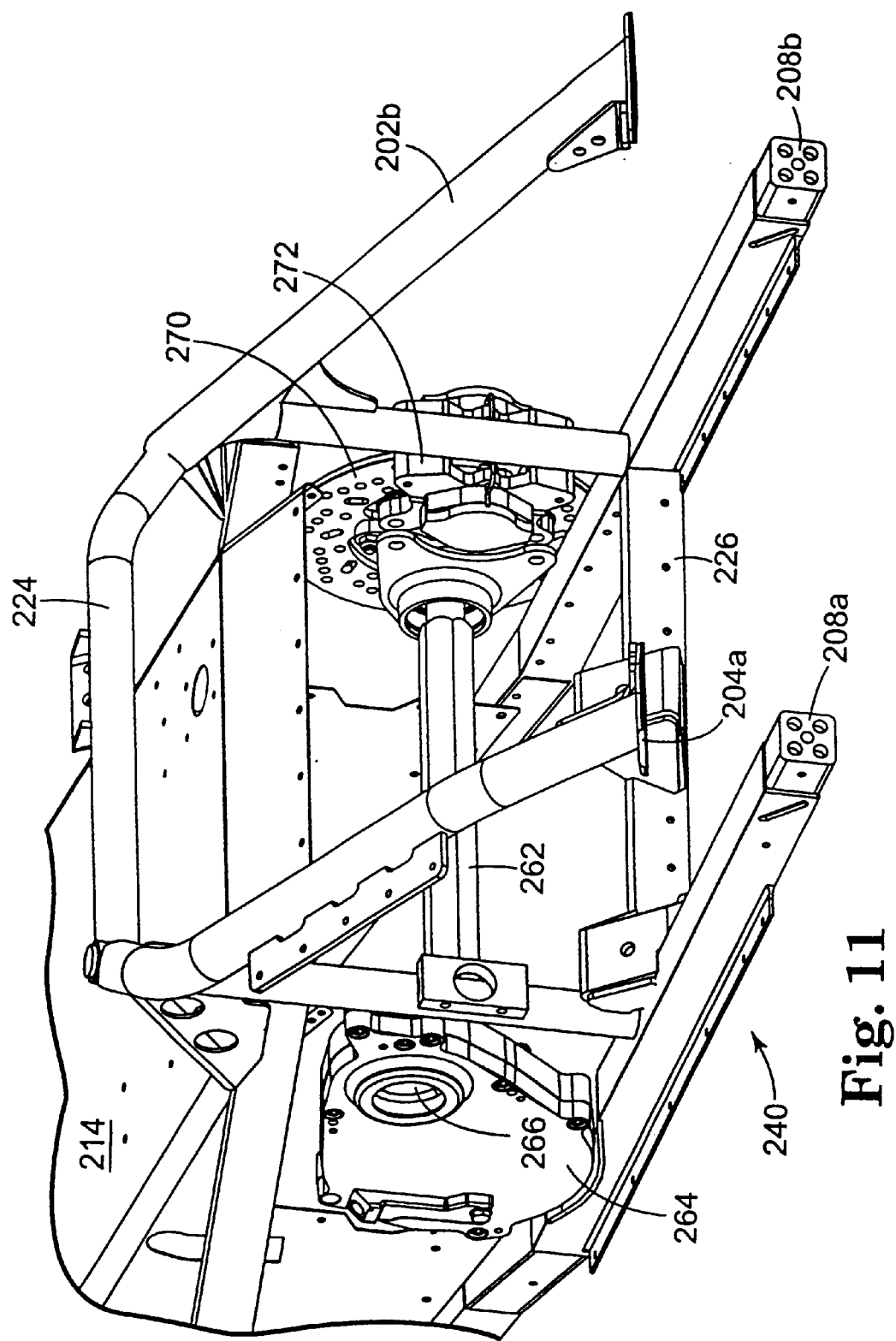
FIG. 11 is a front perspective view of a snowmobile chassis of FIG. 10.
Figure 12:
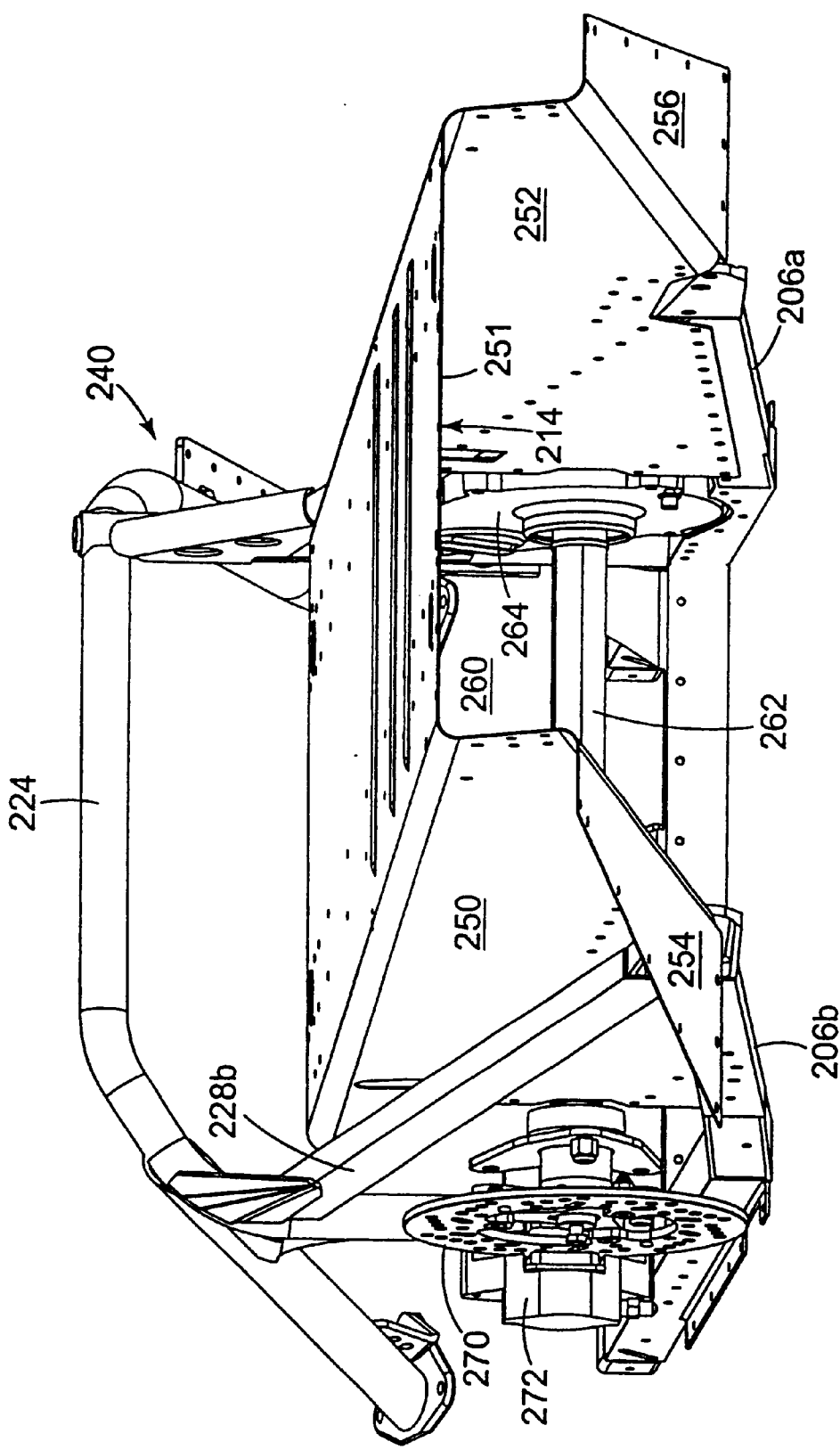
FIG. 12 is a rear perspective view of a snowmobile chassis of FIG. 10.

FIGS. 10, 11, and 12 are various perspective views of a snowmobile chassis 240 of the present invention. The protective shell 214 has a center portion 251 and left and right side portions 250, 252 extending downward towards the upper rear frame members 228a, 228b, respectively. The protective shell 214 can flex at the intersection of the side portions 250, 252 and the center portion 251 during snowmobile operation. Running boards 254, 256 extend laterally outward from the side portions 250, 252, respectively.

As best seen in FIG. 12, the protective shell 214 defines a top edge of an endless belt channel 260 extending along the rear portion of the chassis 240 between the rear frame members 206a, 228a and 206b, 228b. Drive shaft 262 extends across the width of the endless belt channel 260 for engagement with the endless belt (see FIG. 14). In the illustrated embodiment, one end of the drive shaft 260 is directly mechanically coupled to a gearbox 264. The gearbox 264 has a driven pulley input opening 266 for receiving a driven pulley 286 (see FIG. 14). A rotor 270 and a caliber 272 are located on the other end of the drive shaft 262 for providing a breaking force. The rotor 270 and caliber 272 operate as a conventional disk brake system.

Figure 13:
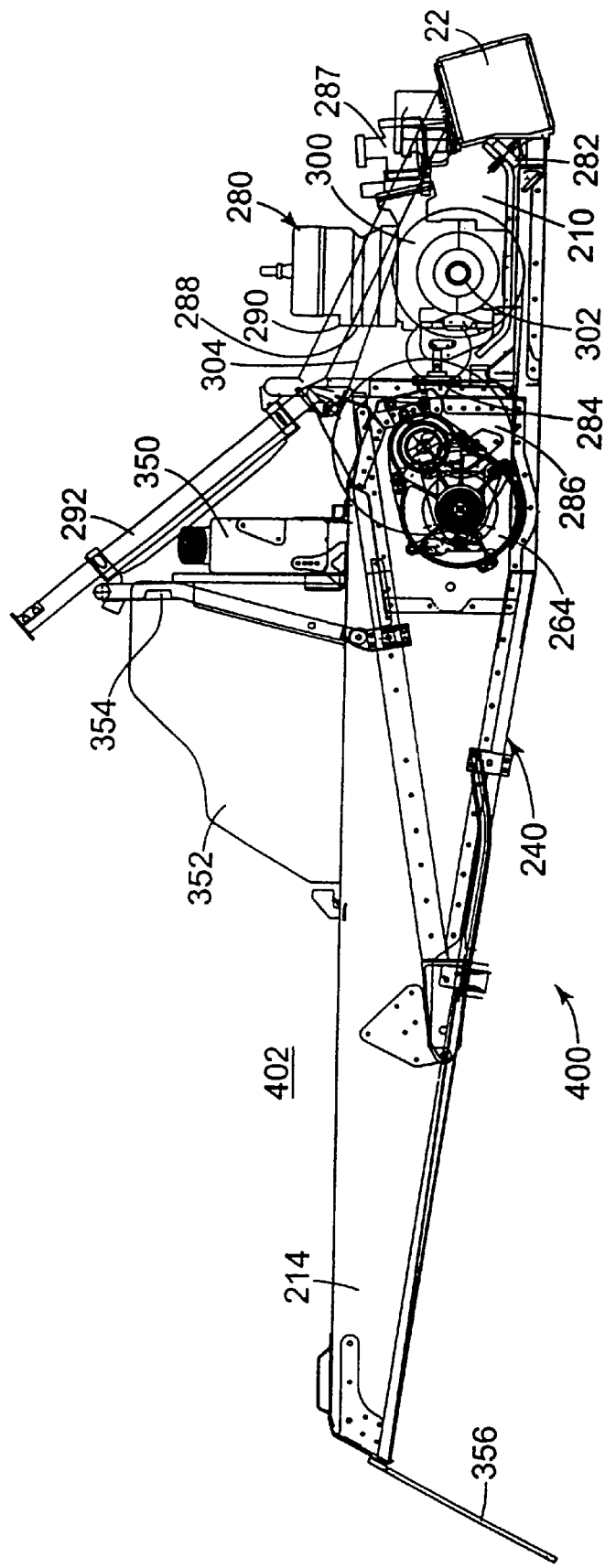
FIG. 13 is a side view of a snowmobile motor and drive train in accordance with the present invention.
Figure 14:
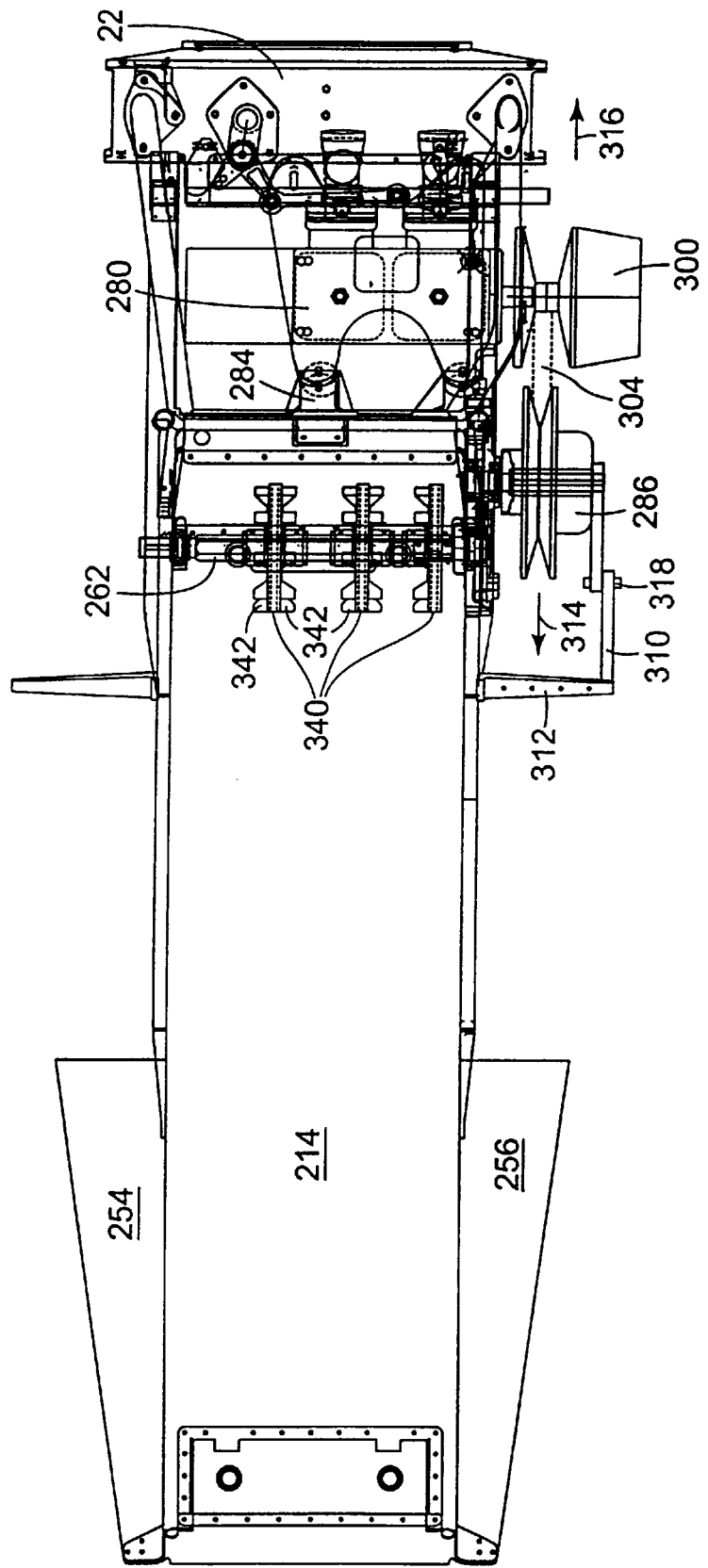
FIG. 14 is a top view of a snowmobile motor and drive train of FIG. 13.

FIGS. 13 and 14 illustrate a side and top view of a snowmobile chassis 240 and drive train in accordance with the present invention. Motor 280 is retained in the motor compartment 210 by various motor mounts 282, 284. In the illustrated embodiment, motor mounts 282 are rigidly connected to the primary support structure 22. In the illustrated embodiment, the motor 280 is a 700 cc twin cylinder, liquid cooled engine generating about 120–125 HP at 8150 RPM, with 83 foot pounds of torque at 8000 RPM, available from Polaris Industries, Inc. of Roseau, Minn. The motor 280 is arranged with carburetors 287 located towards the front, immediately behind the primary support structure 22. Exhaust ports 288 are located on opposite sides of the motor 280.

As is often the case, the exhaust ports 288 are located higher on the motor 280 than the carburetor 287. By arranging the motor 280 with the exhaust ports 288 towards the rear, there is more room to lower the motor 280 further into the chassis 240, resulting in a lower center of gravity for the snowmobile 400. In the embodiment illustrated in FIG. 13, the locations of the carburetors 287 and exhaust ports 288 generally follow the contour or slope of the upper frame members 202b, 202b. It is estimated that the motor 280 is located about 5.1 centimeters to about 7.6 centimeters (2 to 3 inches) lower in the chassis 240 than on comparably powered snowmobiles.

The carburetors 287 tend to require more space than the exhaust system 290. Consequently, locating the carburetors 287 in the front allows the motor 280 to be located closer to the rear of the motor compartment 210. Locating the exhaust system 290 between the motor 280 and the steering column 292 contributes to mass centralization, a lowering the center of gravity and reducing the overall length of the snowmobile, thereby increasing handling performance and ride quality. Additionally, locating the carburetors 287 on the front of the motor 280 is believed to reduce the occurrences of vapor lock. Finally, when the snowmobile is parked in a slightly downhill configuration, fuel will drain from the motor 280 towards the carburetor 287, reducing the chance of engine flooding.

Drive clutch 300 is coupled directly to the crankshaft 302 of the motor 280. The drive clutch 300 is mechanically coupled to the driven pulley 286 by a continuous belt 304. As discussed above, the driven pulley 286 is directly mechanically coupled to the gear box 264. Power is transmitted through a matched set of gears, thereby eliminating the intermediate chain drive that typically is located between the drive pulley and the drive shaft. This partial direct drive configuration increases reliability of power transmission to the track or belt. The drive shaft 262 includes a series of drive wheels 340 having appropriately spaced teeth 342 that engage with ridges on the endless track or belt. A suitable endless track or belt is available from Camoplast Thermoplastic Group of Sherbrooke, Quebec.

An oil tank 350 is located under the steering column 292. A fuel tank 352 is located on the protected shell 214 behind the fuel tank 352. A steering column support structure 354 extends over the fuel tank 352 and supports the steering column 292. A flap 356 is mounted on the end of the protective shell 214 to reduce the snow and debris thrown by the endless track.

Figure 15:
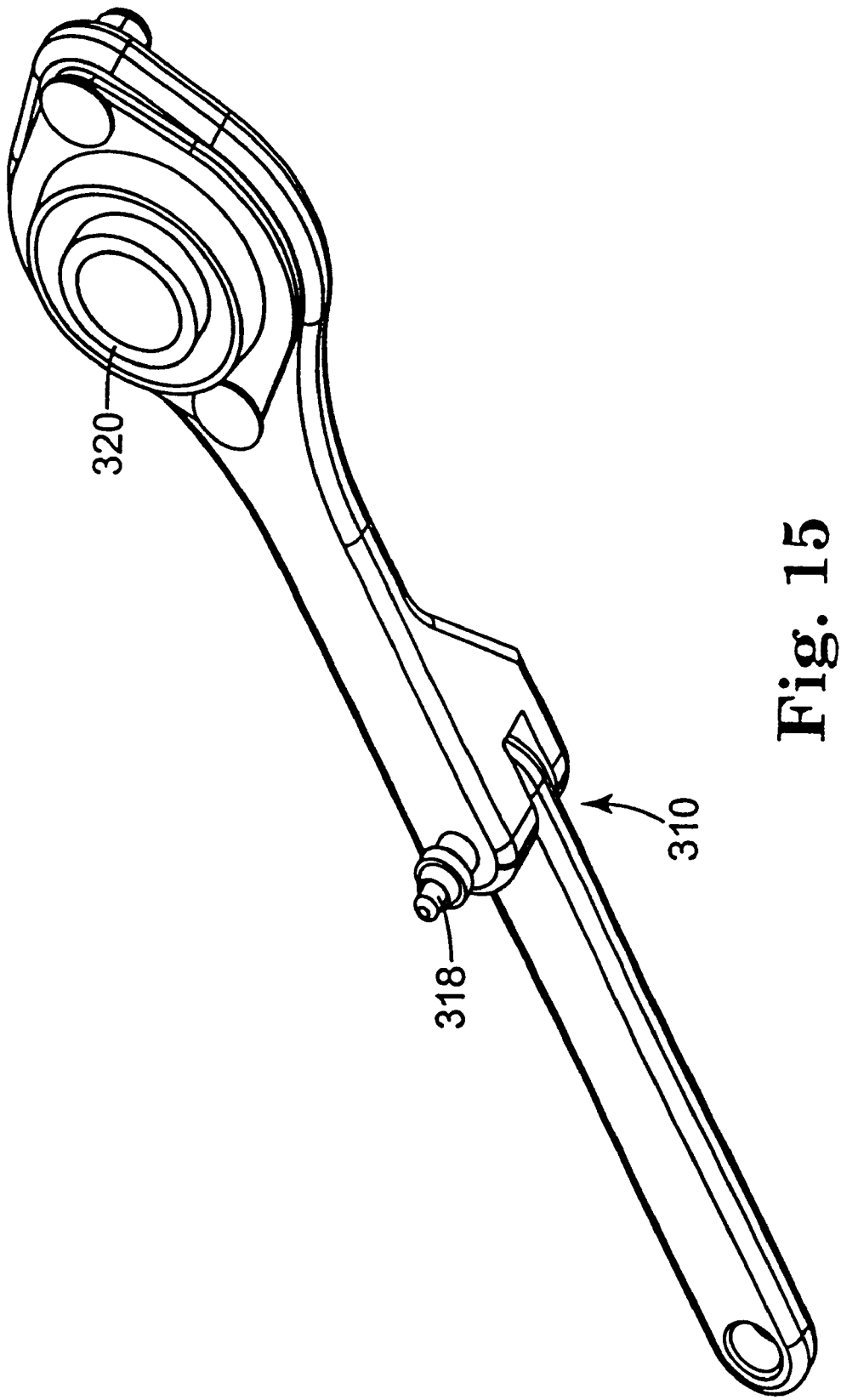
FIG. 15 is a perspective view of a torque arm in accordance with the present invention.

As best seen in FIG. 14, a torque arm 310 extends between a bracket 312 rigidly attached to the frame 200 and the driven pulley 268. The torque arm 310 provides a counteracting force 314 that opposes the force 316 generated by the drive belt 304. A quick release pin 318 is provided on the torque arm 310 to permit the drive belt 304 to be easily replaced as needed. As best illustrated in FIG. 15, the torque arm 310 includes a bearing 320 that engages with a distal end of the driven pulley 268.

Figure 16:
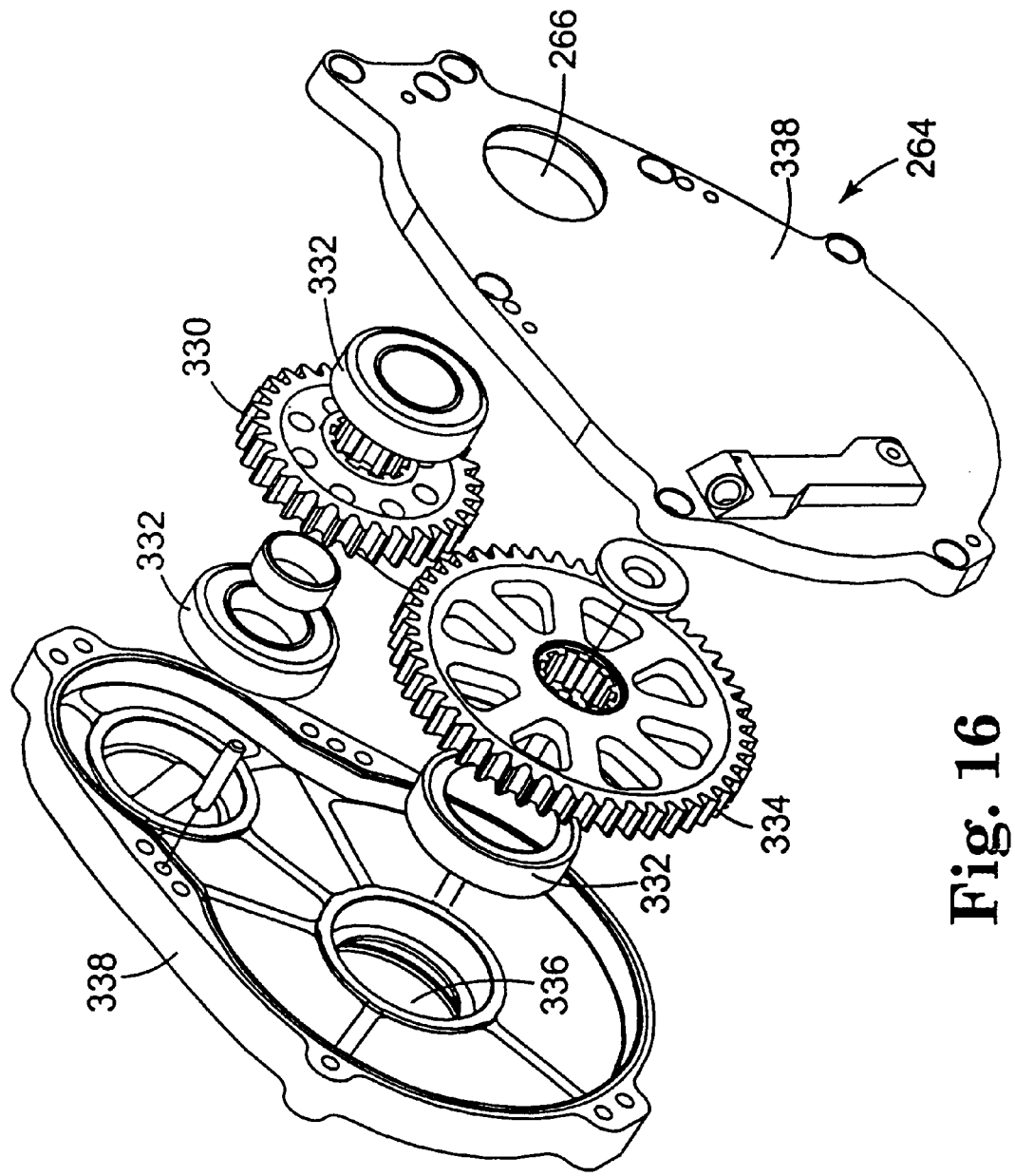
FIG. 16 is an exploded view of a snowmobile gearbox in accordance with the present invention.

FIG. 16 is an exploded view of the gear box 264 in accordance with the present invention. Since the motor 280 is mounted with the crank shaft 302 facing to the right, the drive clutch 300 is turned in the opposite direction of rotation than on a conventional snowmobile. The gear box 264 reverses the direction of the drive system rotation for delivery to the drive shaft 262 and provides the final ratio reduction for the drive train. The driven pulley 286 is directly coupled to a first gear 330 through the opening 266. The gear 330 preferably includes bearings 332 to minimize internal friction and wear. The first gear 330 is meshed with second gear 334, which reverses the direction of rotation of the drive system. The drive shaft 262 is directly coupled to the second gear 334 through the opening 336. In the illustrated embodiment, the gears 330, 334 are covered in a housing 338 with appropriate mounting holes for attachment to the vehicle chassis 240.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A snowmobile assembly comprising:
   a snowmobile chassis having a motor compartment at a front portion and an endless belt channel at a rear portion;
   a motor located substantially in the motor compartment substantially in front of the endless belt channel, the motor comprising at least one fuel control mechanism arranged toward the front portion of the snowmobile chassis, the motor being located lower in the snowmobile chassis and closer to the rear portion of the snowmobile chassis than it would otherwise be if the fuel control mechanism was arranged toward the rear portion;
   an exhaust system fluidly coupled to an exhaust port on the motor such that substantially all of the mass of the exhaust system is located between spindle housings and the rear portion of the snowmobile;
   a drive train coupling the motor to an endless belt drive shaft located in the endless belt channel; and
   an endless belt located in the endless belt channel coupled to the endless belt drive shaft.

2. The snowmobile assembly of claim 1 comprising at least one exhaust port arranged toward the rear portion of the snowmobile chassis.

3. The snowmobile assembly of claim 2 wherein arranging the at least one exhaust port toward the rear portion of the snowmobile chassis provides the snowmobile assembly with greater mass centralization than it would otherwise have if the exhaust port was arranged toward the front portion of the snowmobile chassis.

4. The snowmobile assembly of claim 2 wherein arranging the at least one exhaust port toward a rear portion of the snowmobile chassis provides the snowmobile assembly with a lower the center of gravity than it would otherwise have if the exhaust port was arranged toward the front portion of the snowmobile chassis.

5. The snowmobile assembly of claim 1 wherein the motor is located at least two inches lower in the snowmobile chassis than it would otherwise be if the fuel control mechanism was arranged toward the rear portion.

6. The snowmobile assembly of claim 1 wherein the at least one fuel control mechanism is coupled to a crankcase of the motor.

7. The snowmobile assembly of claim 1 wherein the majority of the mass of the exhaust system is located between the fuel control mechanism and the rear portion of the snowmobile.

8. The snowmobile assembly of claim 1 wherein arranging the at least one fuel control mechanism toward the front portion of the snowmobile chassis provides the snowmobile assembly with greater mass centralization than it would otherwise have if the fuel control mechanism was arranged toward the rear portion of the snowmobile chassis.

9. The snowmobile assembly of claim 1 wherein the motor comprises a crank shaft coupled to the drive train oriented toward a right side of the snowmobile assembly.

10. The snowmobile assembly of claim 1 wherein arranging the at least one fuel control mechanism toward the front portion of the snowmobile chassis provides a space at the rear portion for locating substantially all of the exhaust system.

11. The snowmobile assembly of claim 1 wherein the fuel control mechanism comprises a carburetor.

12. The snowmobile assembly of claim 1 wherein the majority of the mass of the exhaust system is located between the motor and a steering column.

13. A snowmobile assembly comprising:
   a snowmobile chassis having a motor compartment at a front portion and an endless belt channel at a rear portion;
   a motor located substantially in the motor compartment substantially in front of the endless belt channel, the motor comprising at least one exhaust port arranged toward a rear portion of the snowmobile chassis, the motor being located closer to the rear portion of the snowmobile chassis and lower in the snowmobile chassis than it would otherwise be if the at least one exhaust port was arranged toward the front portion of the snowmobile chassis;
   an exhaust system fluidly coupled to an exhaust port on the motor such that substantially all of the mass of the exhaust system is located between spindle housings and the rear portion of the snowmobile;
   a drive train coupling the motor to an endless belt drive shaft located in the endless belt channel; and
   an endless belt located in the endless belt channel coupled to the endless belt drive shaft.

14. The snowmobile assembly of claim 13 comprising at least one fuel control mechanism arranged toward a front portion of the snowmobile chassis.

15. The snowmobile assembly of claim 14 wherein the fuel control mechanism comprises a carburetor.

16. A snowmobile assembly comprising:
- a snowmobile chassis having a motor compartment at a front portion and an endless belt channel at a rear portion;
- a motor located substantially in the motor compartment substantially in front of the endless belt channel, the motor comprising at least one exhaust port arranged toward a rear portion of the snowmobile chassis and at least one fuel control mechanism arranged toward a front portion of the snowmobile chassis, wherein arranging the at least one exhaust port toward the rear portion of the snowmobile chassis provides the snowmobile assembly with greater mass centralization and a lower center of gravity than it would otherwise have if the exhaust port was arranged toward the front portion of the snowmobile chassis;
- an exhaust system fluidly coupled to an exhaust port on the motor such that substantially all of the mass of the exhaust system is located between spindle housings and the rear portion of the snowmobile;
- a drive train coupling the motor to an endless belt drive shaft located in the endless belt channel; and
- an endless belt located in the endless belt channel coupled to the endless belt drive shaft.

17. The snowmobile assembly of claim 14 wherein the motor is located lower in the snowmobile chassis than it would otherwise be if the fuel control mechanism was arranged toward the rear portion.

18. The snowmobile assembly of claim 14 wherein the snowmobile assembly comprises a lower center of gravity than it would otherwise have if the fuel control mechanism was arranged toward the rear portion.

19. The snowmobile assembly of claim 14 wherein the snowmobile assembly comprises greater mass centralization than it would otherwise have if the fuel control mechanism was arranged toward the rear portion.

20. The snowmobile assembly of claim 14 wherein the fuel control mechanism comprises a carburetor.

21. A snowmobile assembly comprising:
- a snowmobile chassis having a motor compartment at a front portion and an endless belt channel at a rear portion;
- a motor located substantially in the motor compartment substantially in front of the endless belt channel, the motor comprising at least one fuel control mechanism arranged toward the front portion of the snowmobile chassis, wherein the motor is located closer to the rear portion of the snowmobile chassis and lower in the snowmobile chasis than it would otherwise be if the at least one fuel control mechanism was arranged toward the rear portion of the snowmobile chassis;
- an exhaust system fluidly coupled to an exhaust port on the motor such that substantially all of the mass of the exhaust system is located between spindle housings and the rear portion of the snowmobile;
- a drive train coupling the motor to an endless belt drive shaft located in the endless belt channel; and
- an endless belt located in the endless belt channel coupled to the endless belt drive shaft.

22. he snowmobile assembly of claim 21 wherein the fuel control mechanism comprises a carburetor.

23. The snowmobile assembly of claim 21 comprising at least one exhaust port arranged toward the rear portion of the snowmobile chassis.

24. The snowmobile assembly of claim 23 wherein arranging the at least one exhaust port toward the rear portion of the snowmobile chassis provides the snowmobile assembly with greater mass centralization than it would otherwise have if the exhaust port was arranged toward the front portion of the snowmobile chassis.

25. The snowmobile assembly of claim 23 wherein arranging the at least one exhaust port toward a rear portion of the snowmobile chassis provides the snowmobile assembly with a lower the center of gravity than it would otherwise have if the exhaust port was arranged toward the front portion of the snowmobile chassis.

26. The snowmobile assembly of claim 21 wherein arranging the at least one fuel control mechanism toward the front portion of the snowmobile chassis provides the snowmobile assembly with greater mass centralization than it would otherwise have if the fuel control mechanism was arranged toward the rear portion of the snowmobile chassis.

27. A snowmobile assembly comprising:
- a snowmobile chassis having a motor compartment at a front portion and an endless belt channel at a rear portion;
- a motor located substantially in the motor compartment substantially in front of the endless belt channel, the motor comprising at least one exhaust port arranged toward a rear portion of the snowmobile chassis, the center of gravity of the snowmobile assembly being lower and closer to the rear portion of the snowmobile chassis than it would otherwise be if the at least one exhaust port was arranged toward the front portion of the snowmobile chassis;
- an exhaust system fluidly coupled to an exhaust port on the motor such that substantially all of the mass of the exhaust system is located between spindle housings and the rear portion of the snowmobile;
- a drive train coupling the motor to an endless belt drive shaft located in the endless belt channel; and
- an endless belt located in the endless belt channel coupled to the endless belt drive shaft.

28. A snowmobile assembly comprising:
- a snowmobile chassis having a motor compartment at a front portion and an endless belt channel at a rear portion;
- a motor located substantially in the motor compartment substantially in front of the endless belt channel, the motor comprising at least one fuel control mechanism arranged toward the front portion of the snowmobile chassis, the center of gravity of the snowmobile assembly being closer to the rear portion of the snowmobile chassis and lower in the snowmobile chassis than it would otherwise be if the fuel control mechanism was arranged toward the rear portion;
- an exhaust system fluidly coupled to an exhaust port on the motor such that substantially all of the mass of the exhaust system is located between spindle housings and the rear portion of the snowmobile;
- a drive train coupling the motor to an endless belt drive shaft located in the endless belt channel; and
- an endless belt located in the endless belt channel coupled to the endless belt drive shaft.

* * * * *